Jan. 15, 1946.    R. L. LINCOLN    2,393,112
DUST COLLECTOR SYSTEM
Filed Jan. 1, 1943    2 Sheets-Sheet 1
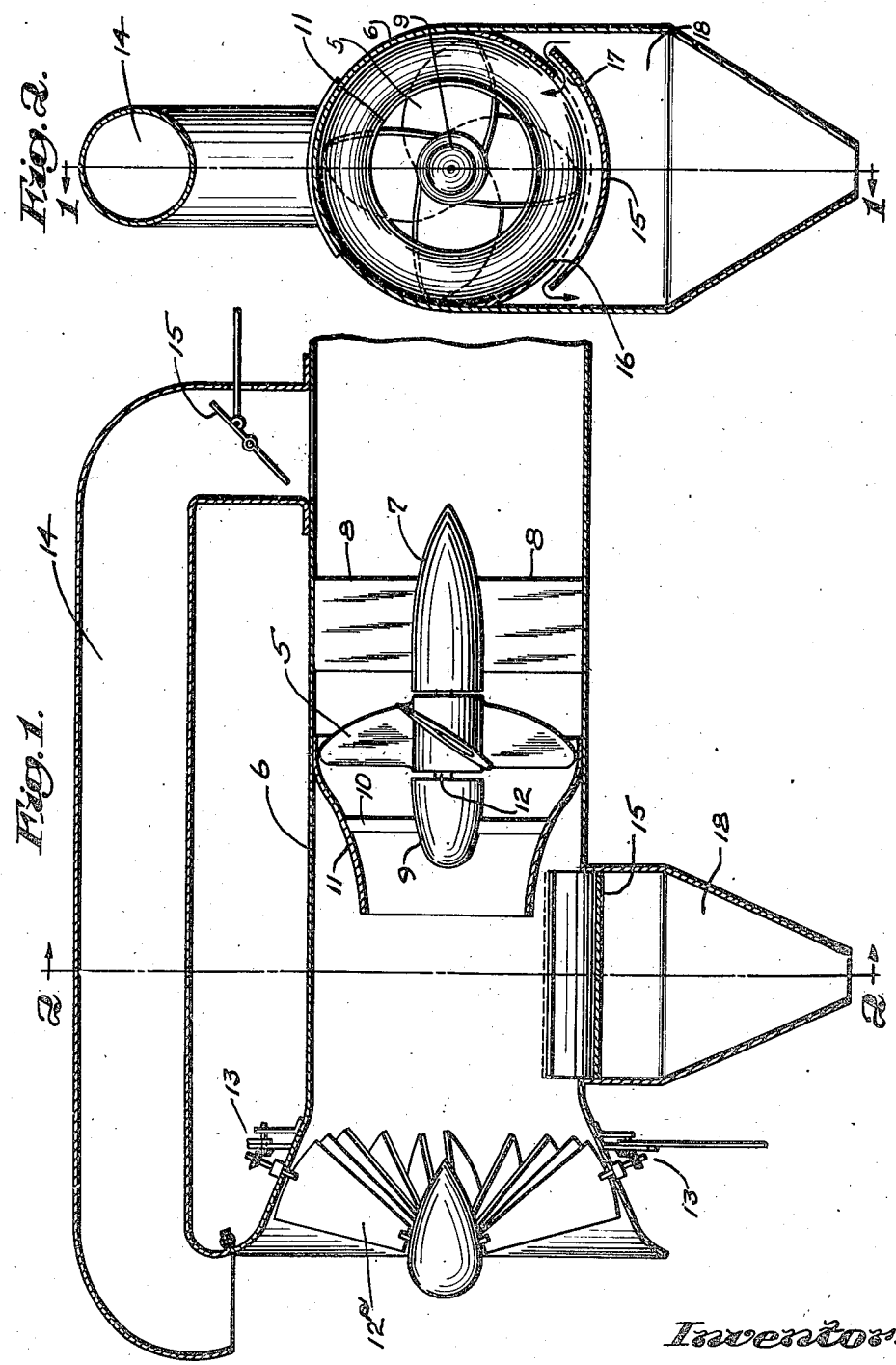

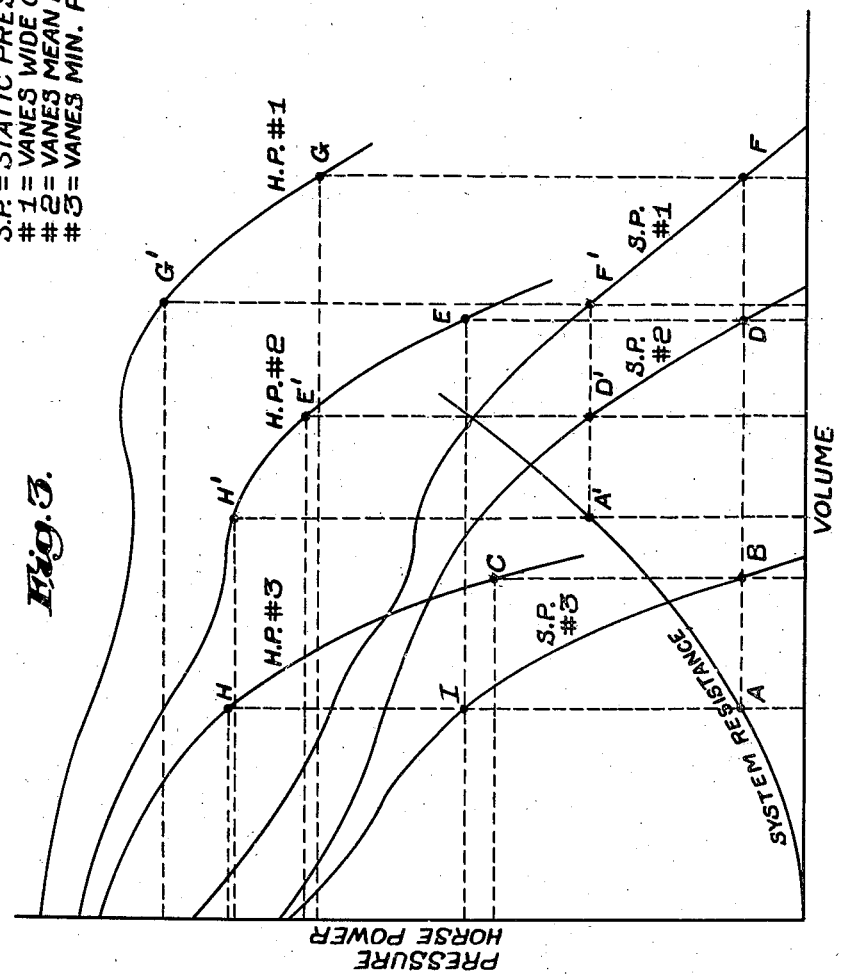

Patented Jan. 15, 1946

2,393,112

UNITED STATES PATENT OFFICE 2,393,112

DUST COLLECTOR SYSTEM

Roland L. Lincoln, Dover, Mass., assignor to B. F. Sturtevant Company, Boston, Mass.

Application January 1, 1943, Serial No. 471,043

6 Claims. (Cl. 183—80)

This invention relates to dust collectors and relates more particularly to dust collector systems using collectors of the cyclone type.

Dust collectors are used with fans in steam power plants, for example, for removing cinders and dust from the flue gases. Axial flow or propeller type fans have not been used with such plants for the reason that at reduced plant loads, reduced air volumes are required and the characteristics of axial flow fans are such that when they are operated in the usual system, they require considerably more power at the greatly reduced outputs required at times, than at rated capacity output, with the result that the power cost at reduced loads, is too great for efficient operation.

It has been determined that an axial flow fan can be operated efficiently by passing larger gas volumes therethrough than are required by the reduced loads and by spinning the gas before it enters the fan.

A cyclone type dust collector is also less efficient when reduced gas volumes below design capacity are passed therethrough. Spin in the gas is, of course, required for collection.

This invention combines axial flow fans and cyclone type dust collectors in duct collection systems so that larger volumes of spinning gas than are required by the loads are handled by both resulting in high operating efficiencies.

An object of the invention is to move gas through a cyclone type dust collector with an axial flow fan in a system such that the efficiencies of the fan and of collection are maintained at reduced loads.

The invention will now be described with reference to the drawings, of which:

Fig. 1 is a side elevation, in section, of a dust collector and axial flow fan system embodying this invention;

Fig. 2 is a sectional view along the lines 2—2 of Fig. 1, and

Fig. 3 is a chart illustrating the performance of the fan in the system of Fig. 1.

The axial flow fan 5 is mounted within the duct 6 and is rotated by a motor enclosed within the stream-lining fairing 7. The fairing 7 and the motor therein are supported from the walls of the duct 6 by the usual spin straightening vanes 8. The stream-lined hub 9 supported by the rods 10 from the fan inlet casing 11, encloses a bearing for the front or up-stream end of the motor shaft 12.

The spin vanes 12a adjustable by the mechanism indicated generally by 13 are of the type shown in detail in the H. F. Hagen Patent No. 1,989,413 and are mounted in the inlet of the duct 6 and function as disclosed in said patent to increase the spin of the air entering the fan when decreased gas pressures are desired.

The recirculation duct 14 containing the adjustable damper 15, opens into the duct 6 at the down-stream side of the fan and discharges into the inlet of the duct 6 adjacent the vanes 12a, and serves as will be explained to recirculate gas moved by the fan, through the fan.

The lower wall 15 of the duct 6 is spaced below the other walls of the duct 6 between the vanes 12a and the fan 5 and forms the tangential duct skimming channel 16 and the oppositely placed injector channel 17. The bin 18 is formed below the wall 15 for receiving the dust skimmed off through the channel 16.

The inlet casing 11 of the fan 5 converges into the dust collecting portion of the duct 6 for providing therearound space for the dust in the gas to be thrown by centrifugal force against the walls of the duct 6, and for the clean gas to enter the fan.

In operation, the vanes 12a are adjusted to give the desired spin for the pressure required and for collection. The spinning gas in the space between the vanes 12a and the fan, throws the dust by centrifugal force against the walls of the duct 6, from which it is passed through the tangential skimming channel 16 into the bin 18. The space in the bin 18 is under suction by the action of the fan and the injector passage 17 whereby the clean gas from the bin 18 is drawn into the fan.

At reduced loads, reduced gas volumes pass through the fan but at such times larger volumes of gas than are required by the loads are moved by the fan, the differences in volumes between those required by the load and those handled by the fan, being recirculated through the duct 14.

The adjustment of the vanes 12a and the damper 15 for providing high fan efficiency will best be understood with reference to the chart of Fig. 3:

With reference now to Fig. 3, the curve entitled "System resistance" indicates the air pressures required from any fan for moving different volumes of air through the boiler of a typical steam plant. The curve entitled "H. P. #1" indicates the horsepowers which would be required by an axial flow fan such as illustrated by Fig. 1, for moving different volumes of air through the said boiler, without spin vanes or with the spin vanes wide open. The curve entitled "S. P. #1" indicates the static pressures which would be provided by the axial flow fan at the different air volumes, without spin vanes or with the spin vanes wide open. The curve entitled "H. P. #2" indicates the horsepowers which would be required by the axial flow fan of Fig. 1 for moving different air volumes through the boiler with the spin vanes 12a set at an intermediate position. The curve entitled "S. P. #2" indicates the air pressures which would be provided by the fan at the different air volumes with the spin vanes set at the intermediate position. The curve entitled "H. P. #3" indicates the horsepowers which would be required by the fan for moving different volumes of air through the boiler with the spin vanes set at minimum (maximum spin inducing) position. The curve entitled "S. P. #3" indicates the air pressures which would be provided by the fan at different air volumes with the spin vanes set at the minimum position.

On the curve of Fig. 3 entitled "System resistance," the load points A and A' are selected as illustrating minimum and maximum load conditions. The performance of the fan will first be described for different vane and damper settings for providing the air pressures and volumes, and horsepowers required at the minimum load corresponding to point A.

Were the spin vanes wide open so that no spin would be imparted to the air, the point F on the static pressure curve #1 would show the pressure required and the point G on the horsepower curve #1 would show the horsepower required. A—F shows the volume of air which would be spilled by adjustment of the damper.

With the spin vanes at the mean position, the pressure required is the same as shown at the point D on the static pressure curve #2, and the horsepower required is shown by the point E on the horsepower curve #2. The volume of air which would be spilled by adjustment of the damper is A—D.

With the vanes at the minimum position, for maximum spin, the pressure is shown by the point B on the static pressure curve #3 and the horsepower is shown by the point C on the horsepower curve #3. The volume of air spilled is A—B. This is the most efficient operating condition for this minimum load.

With no air spillage when the damper is closed, with the spin vanes in the minimum position, the horsepower required is shown by the point H on the horsepower curve #3. The pressure I—A would have to be absorbed as with a damper between the fan outlet and the load for absorbing the excess pressure over that required for providing the required air volume.

The points C, E, G, and H show that for the same reduced delivered air volume, greatly different horsepowers may be required depending upon the vane and damper settings.

The performance of the fan will now be described in connection with a maximum load corresponding to point A' on the system resistance curve.

Were the spin vanes wide open so that no spin would be imparted to the air, the point F' on the static pressure curve #1 would show the pressure required and the point G' on the horsepower curve #1 would show the horsepower required. A'—F' shows the volume of air which would be spilled by adjustment of the damper.

With the spin vanes at the mean position, the pressure required is shown by point D' on the static pressure curve #2, and the horsepower required is shown by the point E' on the horsepower curve #2. The volume of air which would be spilled by adjustment of the damper is A'—D'.

The pressure required is too great for the vanes to be adjusted to the minimum position.

As the load decreases, the vanes are adjusted to provide increased spin, the degree of which increases conformably with the reduction in load. The damper 15 is adjusted for each change of load to exhaust through the duct 14, a volume of air equal to the difference between the desired volume to the load and that delivered by the fan. In practice the vanes 12 would not be fully closed since it is apparent that when they are fully closed, the fan can do substantially no work upon the air and this invention requires that the fans move an excess of air at reduced loads, the excess not being used by the load.

When the gas volumes are reduced, the spin is increased. Since the gas volumes even when reduced are greater than those which would be handled by the usual duct collector connected in the usual system and since at reduced volumes the spin is increased, it is apparent that the dust collection is maintained at high efficiency at reduced loads.

With an induced draft fan, the load for the purpose of this disclosure is considered as the stack into which the fan discharges.

It is desirable but not essential that the recirculation duct be provided. The fan could spill off as into a room, the excess gas, and the fan could at its inlet be provided with a by-pass inlet for drawing gas from the room for providing that the fan handle a greater volume at reduced loads than is delivered to the load.

When the fan in the system of this invention is used for induced draft, the load is at the inlet side of the fan. In this case, the spillage passage may be omitted and instead the duct 14 may connect with the atmosphere or with the air in the apparatus room for enabling air as secondary gas to be drawn in with the primary gas from the load, so that the fan and dust collector handle larger volumes of gas at reduced loads than are supplied by the loads.

The dust collecting portion of the system could, of course, be located at the downstream side of the fan and between the fan and the spin straightening vanes since the gas from the fan retains spin.

In the annexed claims, "spin inducing vanes" are defined as vanes of the type illustrated by said Hagen patent which impart spin to the air entering a fan for decreasing the volume of air moved by the fan.

While one embodiment of the invention has been described for the purpose of illustration, it should be understood that the invention is not limited to the apparatus and arrangement of apparatus illustrated, as modifications thereof may be suggested by those skilled in the art without departure from the essence of the invention.

What is claimed is:

1. A dust collection system comprising a casing having a substantially cylindrical gas guiding wall having a gas inlet and a gas outlet at the opposite ends thereof, means forming a gas passage for connecting said outlet to a load, an axial flow fan mounted axially in said casing between said inlet and outlet, a cyclone dust collector in said casing between said inlet and outlet, said collector having a gas inlet and a gas outlet in axial alignment with said fan, spin inducing vanes in said first mentioned inlet, means for adjusting said vanes at reduced load requirements for increasing the spin in the gas entering said fan and collector, means forming a gas spillage passage connected to said passage for spilling excess gas provided by said fan and not required by said load, therefrom, and dampering means in said spillage passage.

2. A dust collection system comprising a casing having a substantially cylindrical gas guiding wall having a gas inlet and a gas outlet at the opposite ends thereof, means forming a gas passage for connecting said outlet to a load, an axial flow fan mounted axially in said casing between said inlet and outlet, a cyclone dust collector in said casing between said inlet and said fan, said collector having a gas inlet and a gas outlet in axial alignment with said fan, spin inducing vanes in said first mentioned inlet, means for adjusting said vanes at reduced load requirements for increasing the spin in the gas entering said fan and collector, means forming a gas spillage passage connected to said passage for spilling excess gas provided by said fan and not required by said load, therefrom, and dampering means in said spillage passage.

3. A dust collection system comprising a casing having a substantially cylindrical gas guiding wall and having a gas inlet and a gas outlet at the opposite ends thereof, means forming a gas passage for connecting said outlet to a load, an axial flow fan mounted axially in said casing between said inlet and outlet, a cyclone dust collector in said casing between said inlet and outlet, said collector having a gas inlet and a gas outlet in axial alignment with said fan, spin inducing vanes in said first mentioned inlet, means for adjusting said vanes at reduced load requirements for increasing the spin in the gas entering said fan and collector, means forming a gas recirculation passage connected to said passage and said first mentioned inlet for recirculating excess gas provided by said fan and not required by said load, through said fan and collector, and dampering means in said recirculation passage.

4. A dust collection system comprising a casing having a substantially cylindrical gas guiding wall having a gas inlet and a gas outlet at the opposite ends thereof, means forming a gas passage for connecting said outlet to a load, an axial flow fan mounted axially in said casing between said inlet and outlet, a cyclone dust collector in said casing between said inlet and fan, said collector having a gas inlet and a gas outlet in axial alignment with said fan, spin inducing vanes in said first mentioned inlet, means for adjusting said vanes at reduced load requirements for increasing the spin in the gas entering said fan and collector, means forming a gas recirculation passage connected to said passage and said first mentioned inlet for recirculating excess gas moved by said fan and not required by said load, through said fan and collector, and dampering means in said recirculation passage.

5. A dust collection system comprising a casing having a substantially cylindrical gas guiding wall having a gas inlet and a gas outlet at the opposite ends thereof, said inlet being for connection to a load from which gas is to be drawn, means forming an auxiliary gas passage into said inlet for supplying thereinto gas in addition to that drawn from said load, an axial flow fan mounted axially in said casing between said inlet and outlet, a cyclone dust collector in said casing between said inlet and outlet, said collector having a gas inlet and a gas outlet in axial alignment with said fan, spin inducing vanes in said first mentioned inlet, means for adjusting said vanes for increasing, at reduced load requirements, the spin in the gas entering said fan and collector, and dampering means in said auxiliary passage.

6. A dust collection system comprising a casing having a substantially cylindrical gas guiding wall having a gas inlet and a gas outlet at the opposite ends thereof, said inlet being for connection to a load from which gas is to be drawn, means forming an auxiliary gas passage into said inlet for supplying thereinto gas in addition to that drawn from said load, an axial flow fan mounted axially in said casing between said inlet and outlet, a cyclone dust collector in said casing between said inlet and said fan, said collector having a gas inlet and a gas outlet in axial alignment with said fan, spin inducing vanes in said first mentioned inlet, means for adjusting said vanes at reduced load requirements for increasing the spin in the gas entering said fan and collector, and dampering means in said auxiliary passage.

ROLAND L. LINCOLN.